United States Patent [19]
Ohno et al.

[11] 3,785,246
[45] Jan. 15, 1974

[54] RECIPROCATING CUTTING METHOD AND APPARATUS

[75] Inventors: Tadao Ohno; Namio Shimose; Shunzi Konomi, all of Minami Ashigara-machi, Japan

[73] Assignee: Fuji Photo Film Co., Ltd., Kanagawa, Japan

[22] Filed: Dec. 28, 1971

[21] Appl. No.: 213,148

[30] Foreign Application Priority Data
Dec. 28, 1970 Japan.............................. 45/120334

[52] U.S. Cl. ...................... 90/11 C, 83/3, 90/15 R, 144/117 B, 144/232
[51] Int. Cl. ........................... B23c 3/12, B23c 5/00
[58] Field of Search ...................... 83/3; 144/117 B, 144/117 R, 232; 90/15, 11 C

[56] References Cited
UNITED STATES PATENTS

| | | | |
|---|---|---|---|
| 1,023,990 | 4/1912 | Bursell | 144/117 R |
| 436,255 | 9/1890 | Moore et al. | 144/186 |
| 1,853,554 | 4/1932 | Dennis | 144/117 B |

FOREIGN PATENTS OR APPLICATIONS

| | | | |
|---|---|---|---|
| 14,364 | 4/1897 | Switzerland | 144/232 |
| 480,625 | 8/1929 | Germany | 144/232 |

*Primary Examiner*—Francis S. Husar
*Attorney*—Richard C. Sughrue et al.

[57] ABSTRACT

Edge cutting of a work piece is achieved by a rotary cutter which rotates in a first direction as it moves linearly across the edge of the work piece and then rotates in an opposite direction as it reverses its movement to cut off any uncut portion of the projecting edge.

3 Claims, 4 Drawing Figures

PATENTED JAN 15 1974　　3,785,246

RECIPROCATING CUTTING METHOD AND APPARATUS

BACKGROUND OF THE INVENTION

1. FIELD OF THE INVENTION

The present invention relates to a method and an apparatus to cut off the projecting edges which occur during a rotation cutting process of non-metallic materials, especially plastics during the same process as that of cutting.

2. DESCRIPTION OF THE PRIOR ART

In ordinary methods and apparatuses, such edges are cut off by the following process. First, a cut object is released from a setting means and is cut again from an opposite direction or the object to be cut is brought to another process means and cut again. These methods need much time to release the object from the setting means and increases the processes in number and the efficiency of these processes is very low.

In the case where many piled papers and films are cut at the same time, the lowest paper or a film thereof has the tendency not to be cut precisely and remains as a loss.

An object of the present invention to delete the effects mentioned above. That is to say, the present invention may reduce the number of processes, and increase the efficiency of work and provide a cutter and an apparatus to prevent a loss caused by miss cutting of such sheets as papers and films.

BRIEF DESCRIPTION OF THE DRAWINGS

The present invention is now explained according to the embodiment accompanied with drawings.

DESCRIPTION OF THE PREFERRED EMBODIMENT

Figure 1:
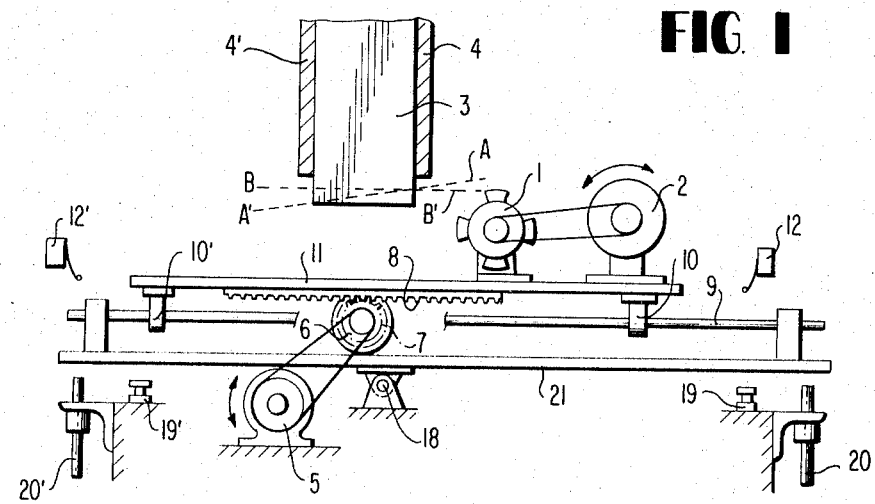
FIG. 1 is a side view of an embodiment of the device used in the method based on the present invention.
Figure 2:
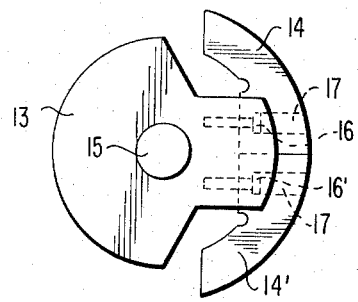
FIG. 2 is a side view showing an example of the structure of a cutter used in the present invention.
Figure 3:
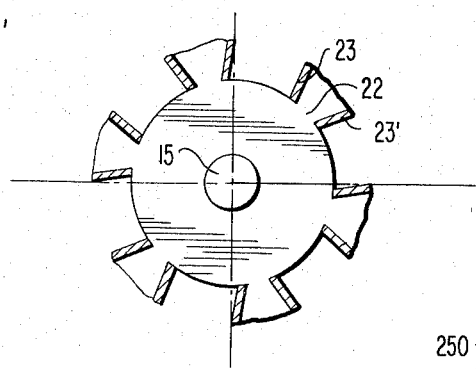
FIG. 3 and FIG. 4 are side views showing another embodiment according to the present invention.
Figure 4:
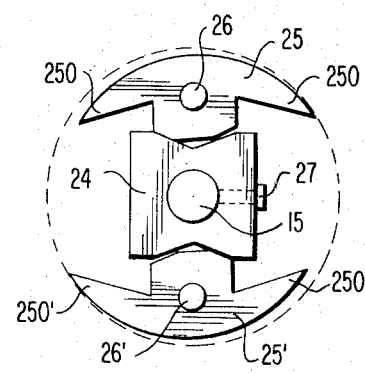

In FIG. 1, numeral 1 is a rotating cutter with both edges as shown in FIGS. 2, 3 and 4 which is reciprocated from one direction to another and vice versa by a motor 2 rigidly fixed on a movable plate 11. On the movable plate is mounted a rack 8 engaging a pinion 7 which makes the movable plate move to the right or to the left. The pinion 7 is on the same shaft on which a bi-directional chuck 6 is mounted and the pinion 7 is driven by a motor 5. Under the movable plate 11 is mounted a journal 10 and the plate 11 is arranged to be able to slide along a guide 9. Numeral 3 indicates an object to be cut and is rigidly fixed by setting tools 4 and 4'.

On a supporting plate 21 is supported a guide plate 9 which guides the cutter 1 and the movable plate 11 having a motor 2 rigidly fixed thereon.

This supporting plate 21 is pivotably mounted on a supporting point 18. Further, this supporting plate 21 is pivoted by a shifting devices 20 and 20'.

The operation of cutting by the method and the apparatus based on the present invention is as follows.

First, the object 3 to be cut is fixed on the setting tools 4 and 4'. Then the supporting plate 21 is made to set at the upper shifted state and the rotating cutter is moved to the left. The stopper 19' decides the shifted height of the supporting plate 21.

The cutting is done as shown by a dotted line A - A' in the drawing against the object 3 to be cut, reducing the depth of cutting.

The point where the cutting terminates is detected by a detecting switch 12', which generates a signal and makes the rotation of the motor 2 reverse at once.

At the moment of reversal of rotation, the shifting device 20' operates and shifts the supporting plate 21 to the predetermined height. Then the rotating cutter cuts the projected part and makes the edge of the object plane as shown a dotted line B - B' in the drawings. The cutting process is thus finished. The reciprocating process of the rotating cutter may be composed of a progressing way A - A' and a reversing way B - B'. (These ways may be not horizontal but may be inclined somewhat.) The projected edge may remain a little during the progressing process and the remaining projected edge may be deleted during the reversing process, or half of the projected edge may be cut of completely during the progressing process and the other half of the projected edge may be cut off completely during the reversing process. In the latter case, the projected edge where the rotating cutter passed during the progressing process does not remain un-cut at all.

FIGS. 2, 3 and 4 show an embodiment of a rotating cutter used in the apparatus based on the present invention indicating the side view thereof. In FIG. 2, a side view of a rotating cutter used in the apparatus according to the present invention is shown. The structure of the cutter is as follows. The cutting blades 14 and 14' are set in the opposite direction to each other by vises (mechanical screws) 16 and 16' on a holder 13 having a rotating shaft 15. The cutting blades 14 and 14' have each a long hole 17 and a long hole 17' respectively and the tips of the blades may each be set parallel to the direction of rotation. FIG. 3 shows the state where the cutting blades 23, 23' are each at different directions and are set on the holder 22 receiving the rotating shaft 15.

FIG. 4 shows an example of the case where a holder 24 with shaft 15 as a rotating shaft is fixed by a vise (a mechanical screw) 27 to the shaft 15. By using the rotation of this holder 24, the tips 250 and 250' of the cutting blades 25 and 25' are shifted radially outwards in the direction of rotating progress and cutting is achieved by the two blades.

What is claimed is:

1. A method for cutting a work piece along one edge by means of a rotatable cutter having oppositely directed cutting edges at the periphery thereof, said method comprising the steps of:

moving said cutter while rotating the same about its axis in a first rotary direction along a linear path intersecting said work piece from one side to the other side in a first linear direction, traversing said work piece while cutting at an angle from said one side to said other side in said first linear direction so as to commence the cutting operation with a substantial cut to a predetermined depth on said one side and diminish the cut toward said other side, and then moving said cutter while rotating the same about its axis in the opposite rotary direction, along a second linear path intersecting said first path and contacting said work piece along the same edge while moving said work piece in a reverse linear direction so as to commence the cutting operation with a substantial cut on said other side and diminish the cut toward said one side so as to terminate the cut at said predetermined depth at said one side to thereby sever the uncut portion of the projecting edge.

2. A reciprocating cutting apparatus comprising:

a rotatable cutter having oppositely directed cutting edges at the periphery thereof, means for selectively rotating said cutter about its axis in either of two directions, a plate for supporting said rotary cutter, means for reciprocating said plate relative to a work piece for cutting said work piece along an edge thereof, means for tilting said plate about an axis parallel to the axis of the rotation of said cutter, and means responsive to travel of said plate between extreme positions for automatically reversing the direction of rotation of said cutter and changing the relative inclination of said plate, whereby, said cutter while rotating in a given direction about its axis moves along a linear path intersecting said work piece from one side to the other in a first linear direction and then while rotating about its axis in the opposite rotary direction moves along a second linear path intersecting said first path and contacting said work piece along the same edge while moving in a reverse linear direction to sever the uncut portion of the projecting edge.

3. The rotatable cutter as claimed in claim 2, comprising a pair of diametrically opposite arcuate cutter blades, means for pivotably mounting said cutting blades for pivoting about an axis parallel to the axis of rotation of said cutter and means carried by said cutter for locking each of said blades in inclined position such that one cutting edge of each arcuate blade lies at a radial distance beyond the other cutting edge of the same blade to define different cutting paths for each direction of reciprocation of said plate supporting said rotatable cutter.

* * * * *